(12) United States Patent
Krichilsky et al.

(10) Patent No.: US 6,530,518 B1
(45) Date of Patent: Mar. 11, 2003

(54) METHOD, SYSTEM AND STORAGE MEDIUM FOR VIEWING PRODUCT DELIVERY INFORMATION

(75) Inventors: Philip Krichilsky, Charlotte, NC (US); Gil Garnsey, Averill Park, NY (US); Stephen J. Meyer, Albany, NY (US); John H. Drake, Latham, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/575,304

(22) Filed: May 19, 2000

(51) Int. Cl.⁷ .............................................. G06F 17/00
(52) U.S. Cl. ........................................ 235/375; 707/10
(58) Field of Search ................................. 235/375, 385; 707/10; 705/28

(56) References Cited

U.S. PATENT DOCUMENTS

| | | |
|---|---|---|
| 5,295,066 A | 3/1994 | Aoki |
| 5,804,803 A * | 9/1998 | Cragun et al. ............... 235/375 |
| 5,809,479 A | 9/1998 | Martin et al. |
| 5,960,408 A | 9/1999 | Martin et al. |
| 6,029,140 A | 2/2000 | Martin et al. |
| 6,055,519 A | 4/2000 | Kennedy et al. |
| 6,073,114 A | 6/2000 | Perkins, III et a l. |
| 6,094,642 A | 7/2000 | Stephenson et al. |
| 6,182,053 B1 * | 1/2001 | Rauber et al. ............... 235/375 |

* cited by examiner

*Primary Examiner*—Kenneth R. Rice
*Assistant Examiner*—Lynda Jasmin (57) ABSTRACT

An exemplary embodiment of the invention is a method for providing information on product delivery in a system having a user system coupled to a host system through a network and a database coupled to the host system. The method includes receiving at the host system a request from a user system for a product delivery report. Order data from the database is obtained in response to the request and a product delivery report is generated in response to the order data. The order data includes a requested delivery date for at least one order and the product delivery report contains a span value for one or more orders. The span value is determined in response to the requested delivery date. The product delivery report is provided to the user system. Further embodiments include a system and storage medium for implementing the method.

26 Claims, 9 Drawing Sheets

METHOD, SYSTEM AND STORAGE MEDIUM FOR VIEWING PRODUCT DELIVERY INFORMATION

BACKGROUND OF THE INVENTION

The invention relates to product delivery and in particular to a method, system and storage medium for viewing product delivery information. In today's business world, customer satisfaction is crucial to the success of any enterprise. A key source of customer dissatisfaction is errors in delivering products to the customer. Often a customer requires a product delivered on a requested date and often at a requested time. The ability to meet this requested delivery date is important in maintaining customer satisfaction. Products arriving at the customer prior to the requested delivery date can result in storage problems for the customer who lacks space to store the product. Products arriving at the customer after the requested delivery date can cause delays in the customer's business. Accordingly, meeting the requested delivery date is crucial to maintaining customer satisfaction.

Sales over the Internet have also forced product providers to meet increasingly higher demands from consumers. Such high volume purchasing can overwhelm product suppliers. For example, in December 1999, Toys R Us notified shoppers of toysrus.com that holiday gifts would not be delivered to the customer until after Dec. 25, 1999. With on-line shopping services becoming increasingly available, customers can easily direct their business to competitors when requested delivery dates are not met. These demands on product providers to deliver products to customers on the requested delivery date have created a need for a method and system for viewing product delivery information so that the product delivery process can be improved.

BRIEF SUMMARY OF THE INVENTION

An exemplary embodiment of the invention is a method for providing information on product delivery in a system having a user system coupled to a host system through a network and a database coupled to the host system. The method includes receiving at the host system a request from a user system for a product delivery report. Order data from the database is obtained in response to the request and a product delivery report is generated in response to the order data. The order data includes a requested deli very date for at least one order and the product delivery report contains a span value for one or more orders. The span value is determined in response to the requested delivery date. The product delivery report is provided to the user system. Further embodiments include a system and storage medium for implementing the method.

DETAILED DESCRIPTION OF THE INVENTION

Figure 1:
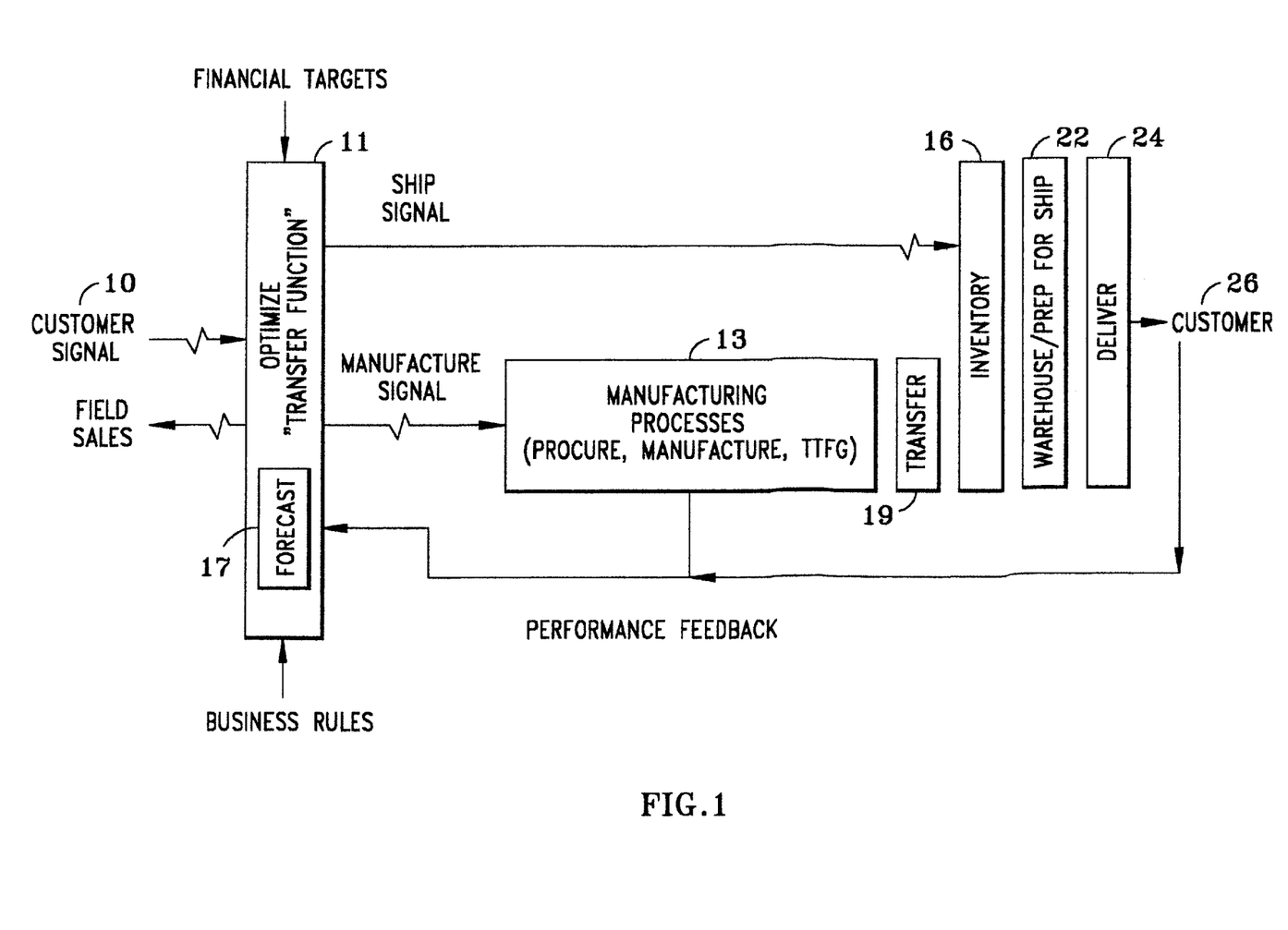
FIG. 1 is a simplified block diagram of a product delivery process.

The invention is related to a method and system for providing product delivery information. FIG. 1 is a simplified block diagram of a product delivery process. A customer signal 10 indicating a desire for a product is processed by an optimization process 11. The optimization process can initiate manufacture of a product if the product is not currently in inventory by submitting a manufacturing signal to a manufacturing process 13. If the ordered product is available, the optimization process 11 initiates transferring the product from an inventory process 16 by sending a ship signal to inventory process 16. The optimization process 11 also receives business rules and financial targets and can initiate manufacturing or shipping in response to these inputs. In addition, the optimization process includes a forecast module 17 which can initiate manufacturing based on predicted demand for a product.

From the manufacturing process 13, a transfer process 19 transports products from the manufacturing process to inventory process 16. This may include physically moving the products from a manufacturing location to an inventory location and recording receipt of the products in the inventory location. From the inventory process 16, the product is prepared for shipment through a warehouse/preparation for shipment process 22. This may include removing assorted products from inventory, packaging the products, labeling the products for delivery, etc. Finally, a delivery process 24 transports the products to a customer 26. The delivery process may include transportation of the product to the customer through a carrier. The customer can provide feedback which affects the optimization process 11 and the manufacturing process 13.

The customer signal 10 typically will include a requested delivery date for the product. As is well known in the art, the process of providing a product to a customer on a requested delivery date can be formidable task. The present invention provides a method and system for viewing product delivery information to reduce the difference between the customer requested delivery date and the actual delivery date.

Figure 2:
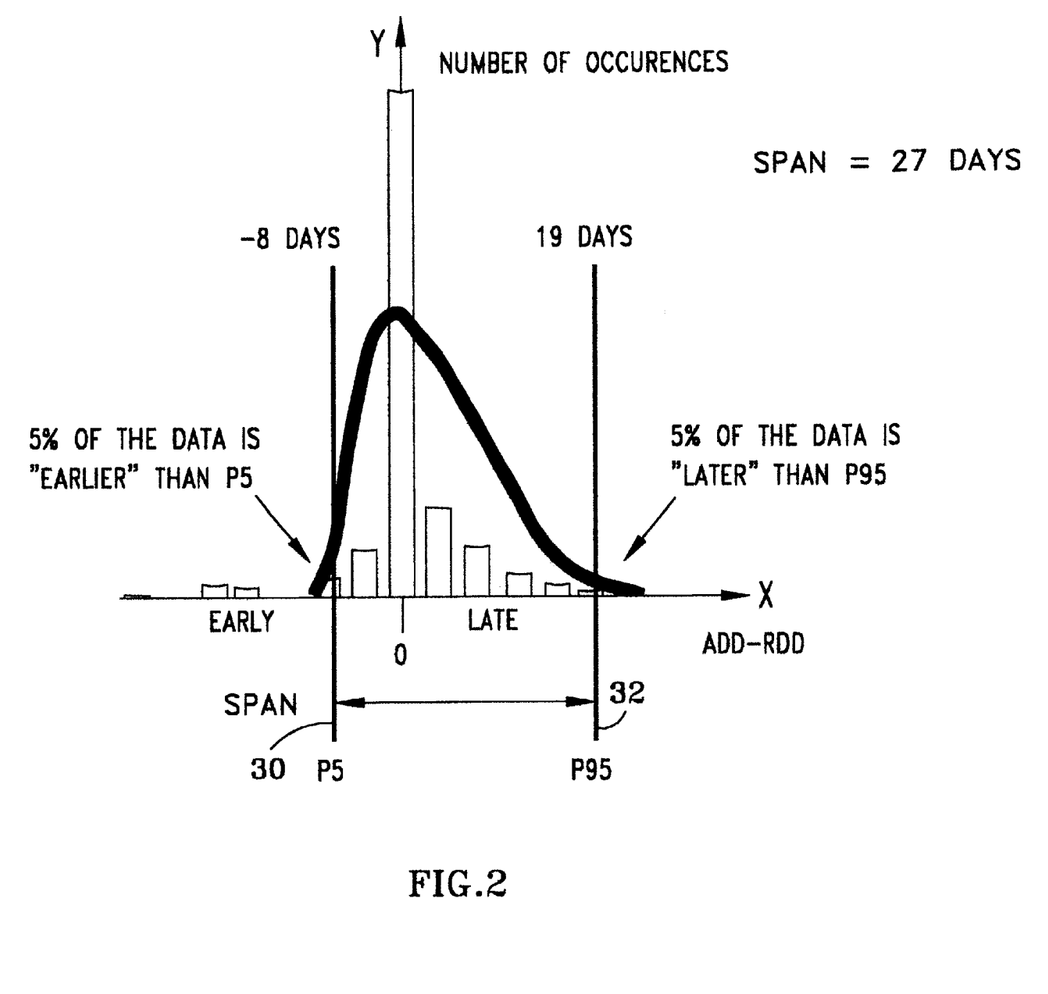
FIG. 2 is a histogram of delivery errors.

FIG. 2 is a plot of product delivery data shown in histogram form. The x-axis represents actual delivery date (ADD) minus requested delivery date (RDD). The term date is intended to have a broad meaning and may be measured in days, hours and/or minutes depending on the level of specificity desired. This difference can be considered the delivery error. Ideally, the delivery error should be zero for all shipments. The y-axis represents the number of occurrences for each delivery error. From the data in FIG. 2, a span value can be determined which represents how effectively the requested delivery date is being met. The span value is equal to the time from the earliest shipment (largest negative delivery error) to the latest shipment (largest positive delivery error). The delivery error data may be limited to prevent isolated incidents (e.g., outlier data) from corrupting the span value. As shown in FIG. 2, the delivery error data may be limited by a lower limit 30 and upper limit 32. In the example shown in FIG. 2, the lower limit is the $5^{th}$ percentile of the delivery error data and the upper limit is the 95$^{th}$ percentile of the delivery error data. It is understood that different limits (e.g., 2$^{nd}$ percentile to 98$^{th}$ percentile) may be used or no limits may be imposed on the delivery error data. To determine the span value, the time between the earliest shipment and the latest shipment is determined and used as the span value. In the example shown in FIG. 2, the earliest shipment (without viewing data below the 5$^{th}$ percentile) was eight days early. The latest shipment (without viewing data above the 95$^{th}$ percentile) was nineteen days late. This results in a span value of twenty seven days. Although the delivery error data is shown in terms of days, it is understood that any time scale may be used.

In addition to using the span value to evaluate product delivery, the median of the delivery error data is also an indication of product delivery effectiveness. Ideally, the 50$^{th}$ percentile or the median corresponds to a delivery error of zero. Given the variance in the delivery error data, common statistical measurements such as mean and standard deviation are not effective in measuring product delivery. Due to this variance, the invention uses span and median as measures of product delivery.

Figure 3:
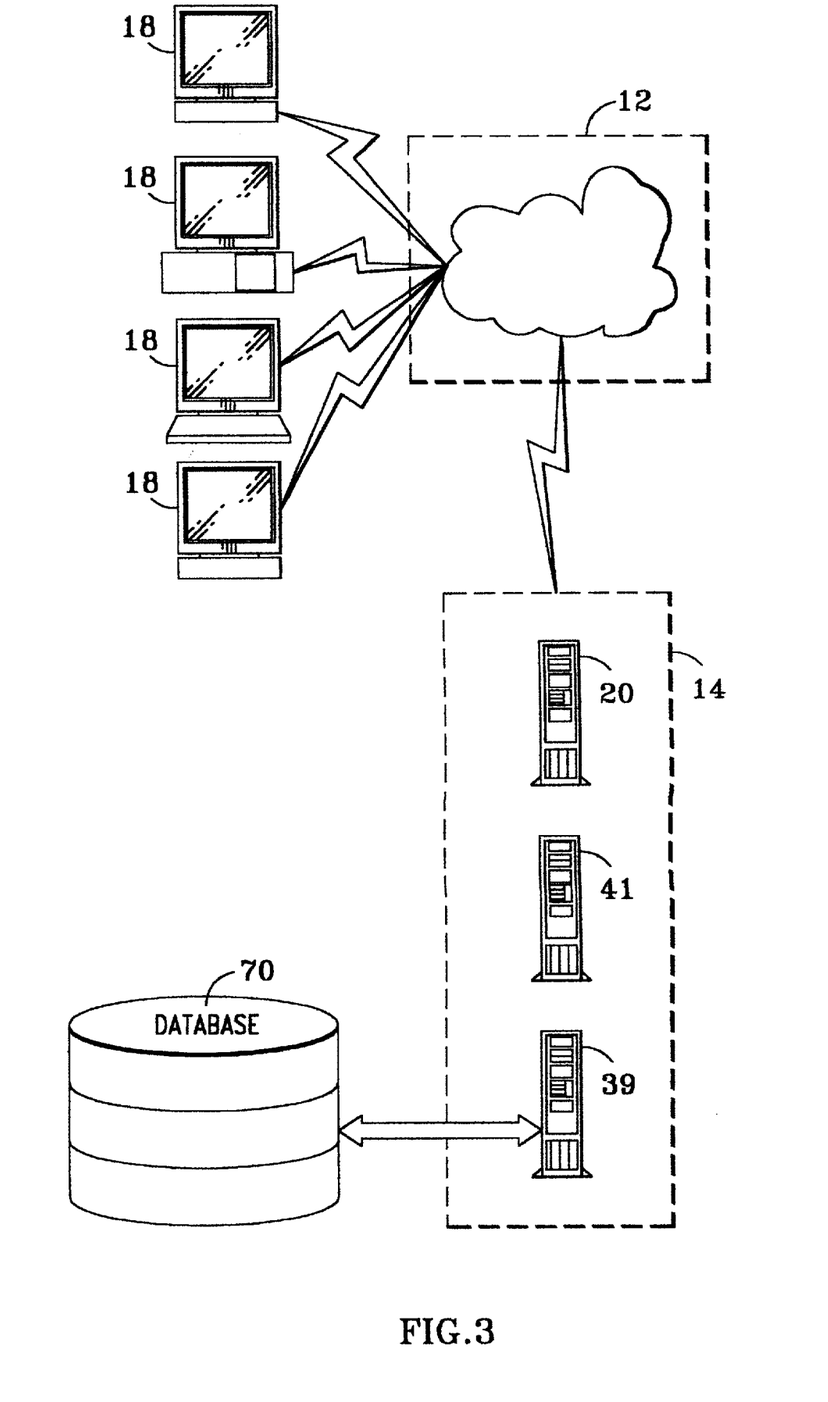
FIG. 3 is a block diagram of an exemplary system for providing product delivery information.

FIG. 3 is a block diagram of a system for providing product delivery information in one embodiment of the invention. The system includes one or more user systems 18 coupled to a host system 14 via a network 12. Each user system 18 may be implemented using a general-purpose computer executing a computer program for carrying out the process described herein. The network 12 may be any type of known network including a local area network (LAN), a wide area network (WAN), the global network (e.g., Internet), intranet, etc. One or both of the user systems 18 and the host system 14 may be connected to the network 12 in a wireless fashion and network 12 may be a wireless network. In a preferred embodiment, the network 12 is the Internet and each user system 18 executes a user interface application (e.g., web browser) to contact the host system 14 through the Internet 12. Alternatively, the user system 18 may be implemented using a device programmed primarily for accessing network 12 such as WebTV.

The host system 14 includes a network server 20 (often referred to as a web server) to communicate with the user systems 18. The network server may be implemented using commercially available servers as are known in the art. The network server 20 handles sending and receiving information to and from user systems 18 and can perform associated tasks. The host system 14 also includes a firewall 41 to: (1) prevent unauthorized access to the host system 14; and (2) with respect to individuals/companies that are authorized access to the host system 14, enforce any limitations on the authorized access. For instance, a system administrator typically may have access to the entire system and have authority to update portions of the system. By contrast, a user contacting the host system 14 from a user system 18 would have access to use applications provided by applications server 39 but not alter the applications or data stored in database 70. The firewall 41 may be implemented using conventional hardware and/or software as is known in the art.

The host system 14 also includes an applications server 39. Applications server 39 generates a number of reports for users at user systems 18. Each report provides product delivery information as described herein. The applications server 39 is coupled to a database 70 which contains data concerning orders placed with a product provider including when the order was taken, the requested delivery date, the promised delivery date, the carrier used to ship the product, etc. Each of the reports, and the order data associated with each report, is described herein.

Figure 4:
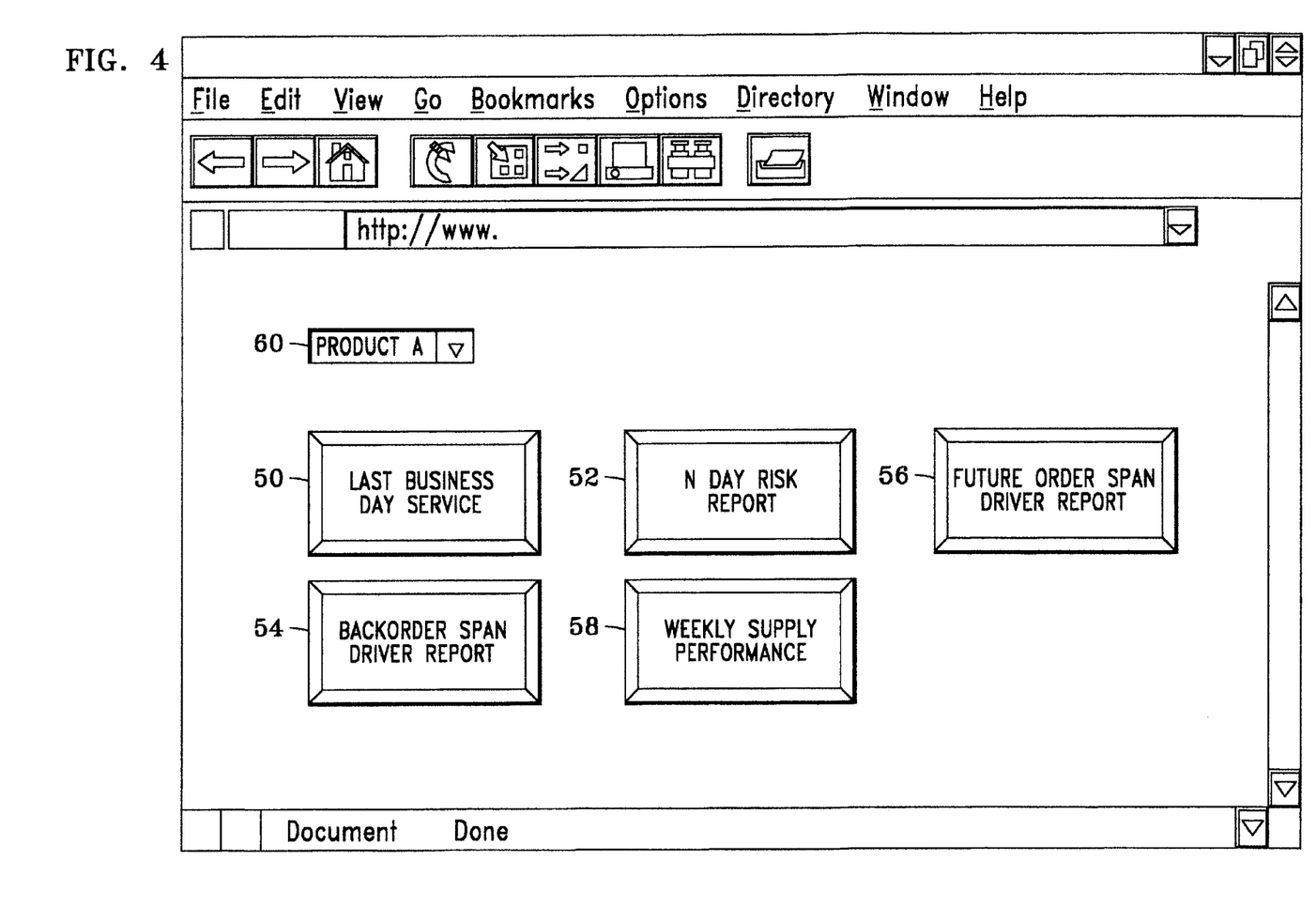
FIG. 4 depicts an exemplary main screen presented to a user system.

FIG. 4 is an exemplary main screen that is presented to a user system 18 upon accessing the host system 14. The user system 18 is presented with a number of report buttons 50, 52, 54, 56 and 58. The user can chose a report by a selecting a button using an input peripheral (e.g., mouse, trackball, keyboard) at user system 18. The user can also limit the report through a drop down menu 60 that allows the user to indicate the scope of the orders included in the report. The user may select all orders, orders for a specific product (e.g., Product A as shown in FIG. 4), orders from a group of products, orders made from a manufacturing location, orders manufactured on a particular line or machine, etc. The user may also select reports for orders of samples of a product. In certain industries (e.g., plastics) samples are sent to customers for testing and analysis. Thus, the reports are not limited to commercial, non-sample orders.

Figure 5:
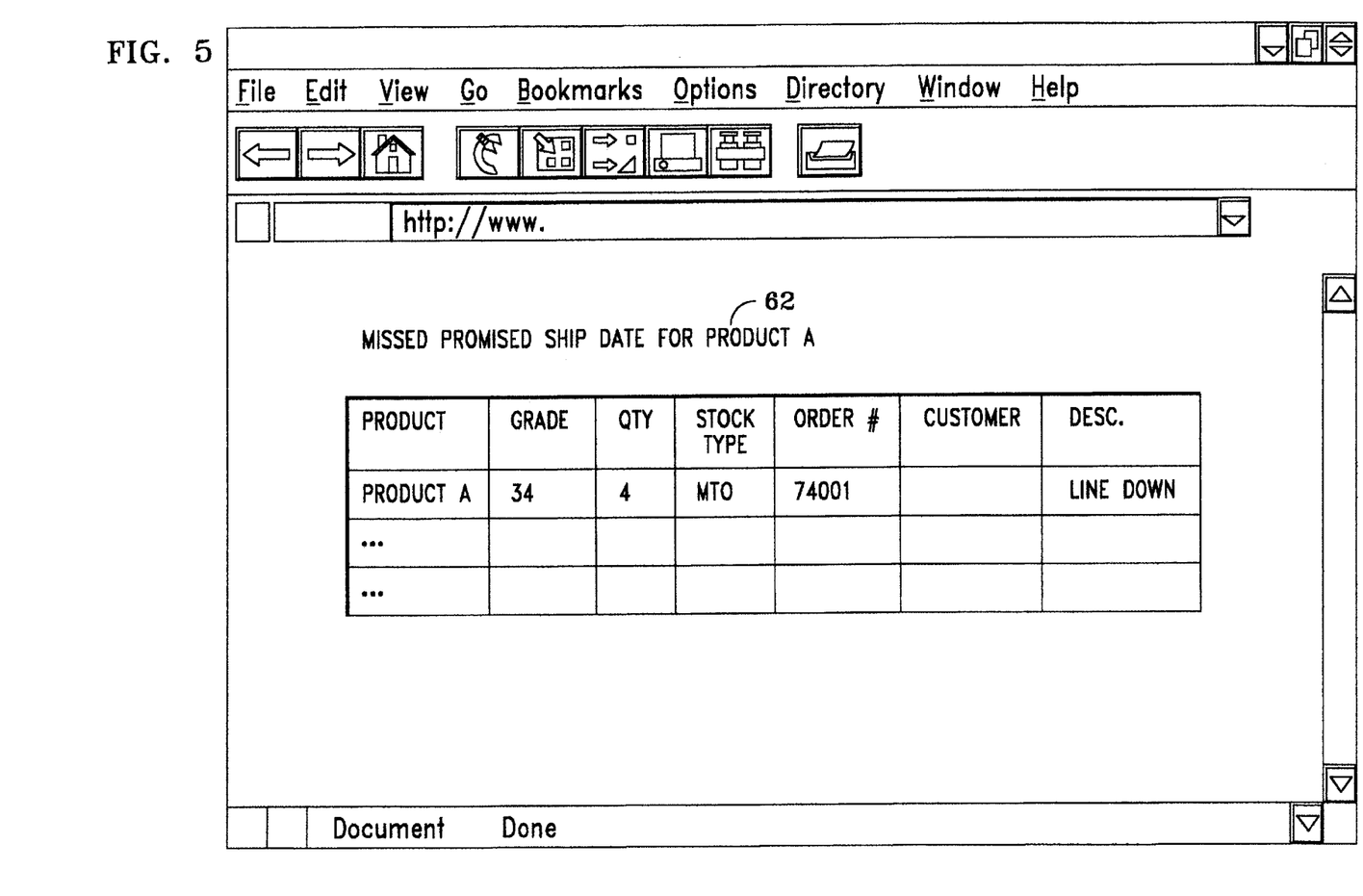
FIG. 5 depicts an exemplary report of orders not shipped on a promised ship date.

If the user selects report button 50, a report indicating the last business day's service is provided to the user system 18. An exemplary report is shown in FIG. 5 and indicates failures of the product supplier to ship the product to the customer on the promised ship date. When a customer places an order, the customer provides a requested delivery date. Occasionally, the product provider cannot meet the requested delivery date and provides the customer with a promised delivery date based on supply chain factors such as lead time for manufacturing the product. Failure to meet a promised delivery date may result in a loss of trust in the product provider.

The report includes a designator 62 for the orders in the report that coincides with the scope selected by the user in drop down menu 60. Information regarding the orders in the report includes a product identifier, a product grade, quantity of the order, stock type (make to stock, make to order, etc.), an order number, a customer identifier and a description for the failure to meet the promised ship date. It is understood that additional information may be included in the report such as the customer service employee who entered the order, the line that produced the order, etc. Any information that is contained in database 70, as described in further detail herein, may be incorporated into the report. The description allows the user to identify causes for the failure and enact corrective measures to ensure that promised ship dates are met in the future.

Figure 6:
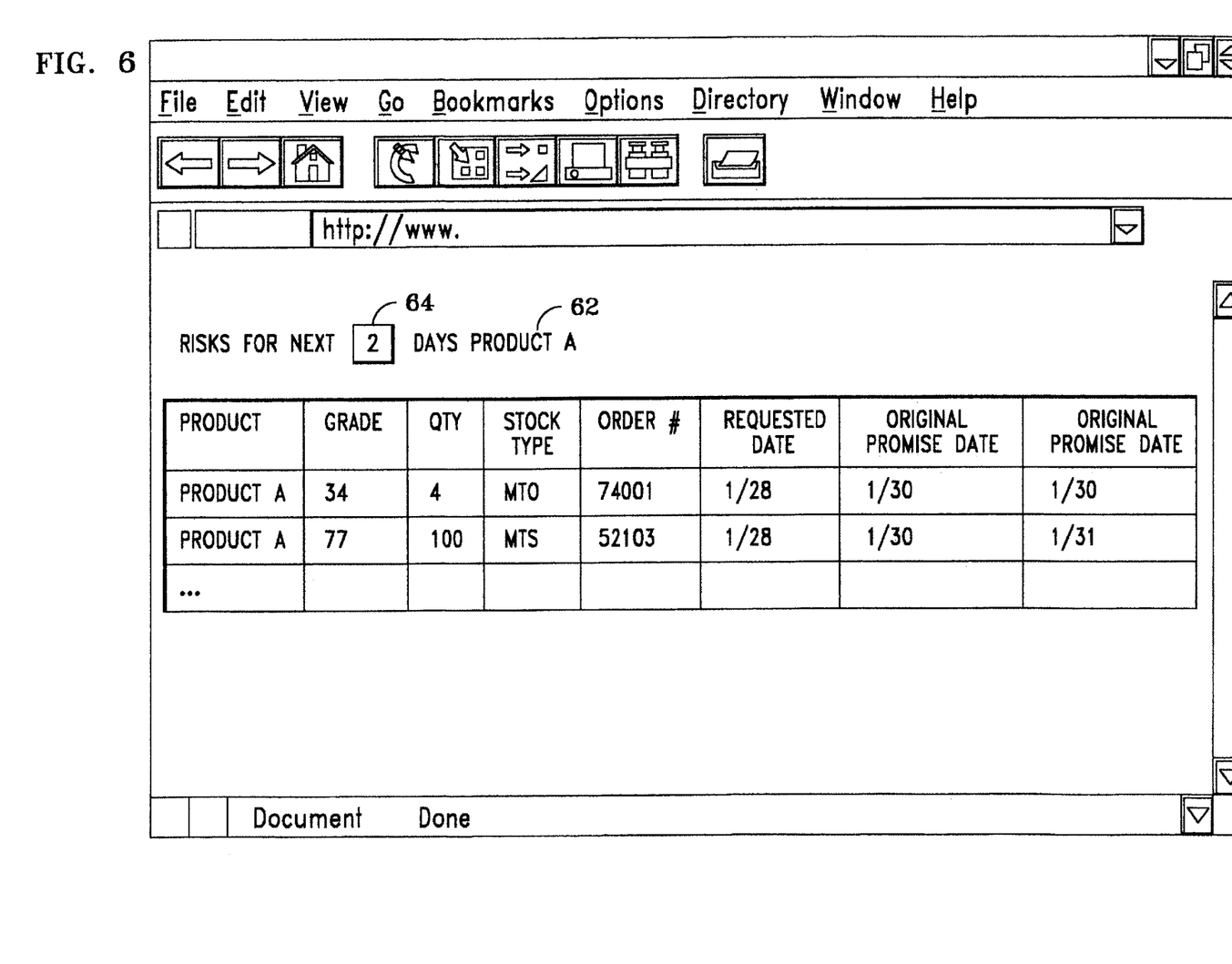
FIG. 6 depicts an exemplary report of orders within a time period of a promised ship date.

If the user selects report button 52, a report indicating risks for the next N business days is provided to the user system 18. An exemplary report is shown in FIG. 6 and indicates orders for which the original promised ship date is within the next two days. The report includes a designator 62 for the orders in the report that coincides with the scope selected by the user in drop down menu 60. The user can specify a time period through time period field 64. The report contains all orders having original promised ship dates falling in that time period.

Information regarding the orders in the report includes a product identifier, a product grade, quantity of the order, stock type (e.g., make to stock or make to order) and an order number. It is understood that additional information may be included in the report such as the customer service employee who entered the order, the line that produced the order, etc. Any information that is contained in database 70, as described in further detail herein, may be incorporated into the report. The report also includes a current promised delivery date. For most orders, the original promised delivery date does not change. For some orders, however, the product provider contacts the customer and changes the promised delivery date. This may occur as a result of a number of supply chain factors such as manufacturing delays. Orders having a current promised delivery date not equal to the original promised delivery date are displayed in an alternate format (e.g., highlighted, shaded, bold, etc.) from other orders in the report.

Figure 7:
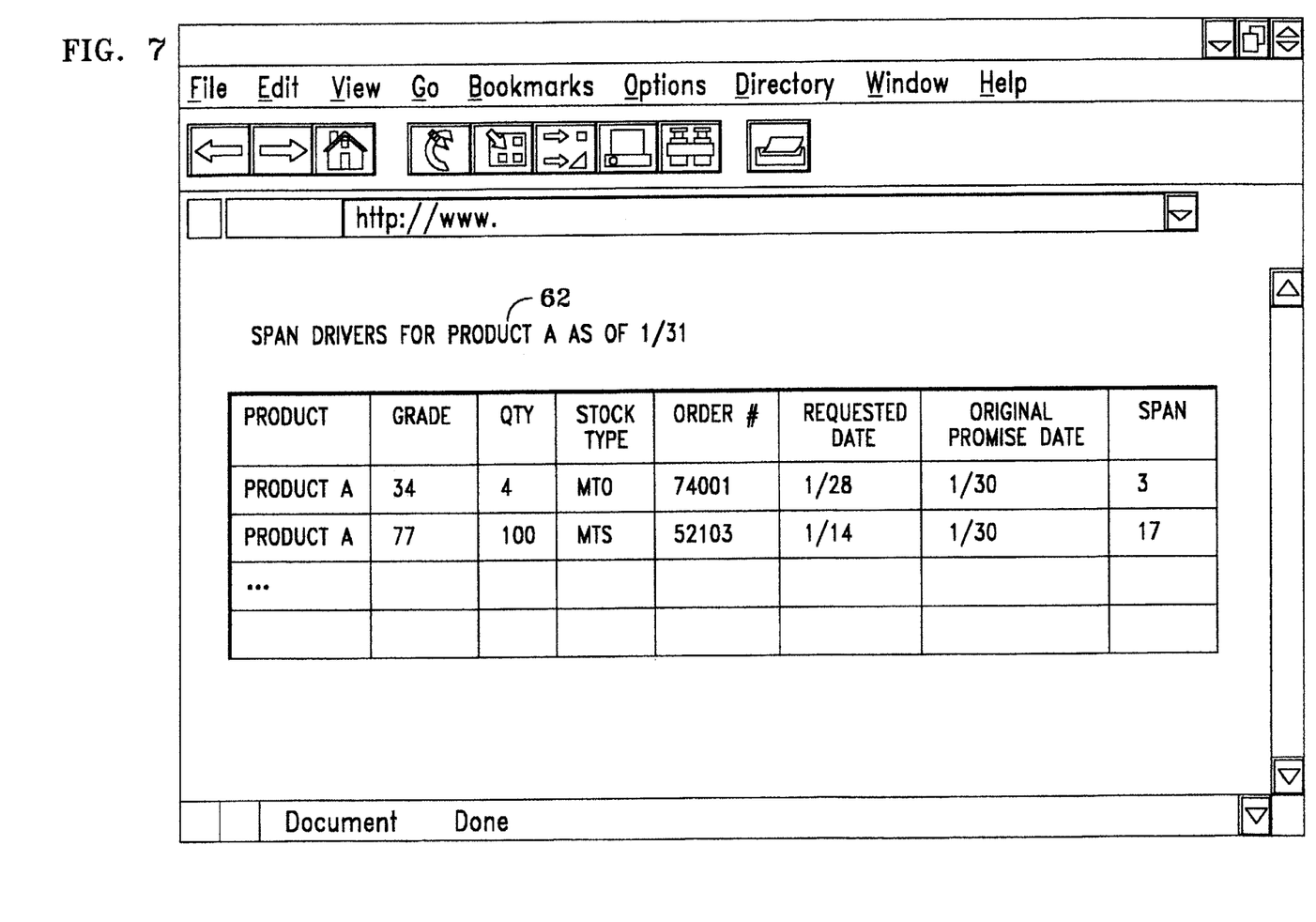
FIG. 7 depicts an exemplary report of backorders affecting span.

If the user selects report button 54, a report indicating span drivers is provided to the user system 18. As described above, the span value for an order is the actual delivery date minus the requested delivery date. The span driver report provides an identification of backorders (i.e., orders that will contribute a positive span value) that have not been shipped. In other words, unshipped orders having a requested delivery date that is prior to the current date appear in the report. An exemplary report is shown in FIG. 7 and indicates orders for which the requested delivery date is prior to the current date. In the example shown in FIG. 7, the current date is January 31. The report includes as designator 62 for the orders in the report that coincides with the scope selected by the user in drop down menu 60.

Information regarding the orders in the report includes a product identifier, a product grade, quantity of the order, stock type (make to stock, make to order, etc.) and an order number. It is understood that additional information may be included in the report such as the customer service employee who entered the order, the line that produced the order, etc. Any information that is contained in database 70, as described in further detail herein, may be incorporated into the report. The report includes the span value that allows the user to determine the orders having the highest effect on span. The span value is calculated based on the current date minus the requested delivery date. Accordingly, the user can prioritize orders to ship orders having the greatest effect on the product provider's overall span.

Figure 8:
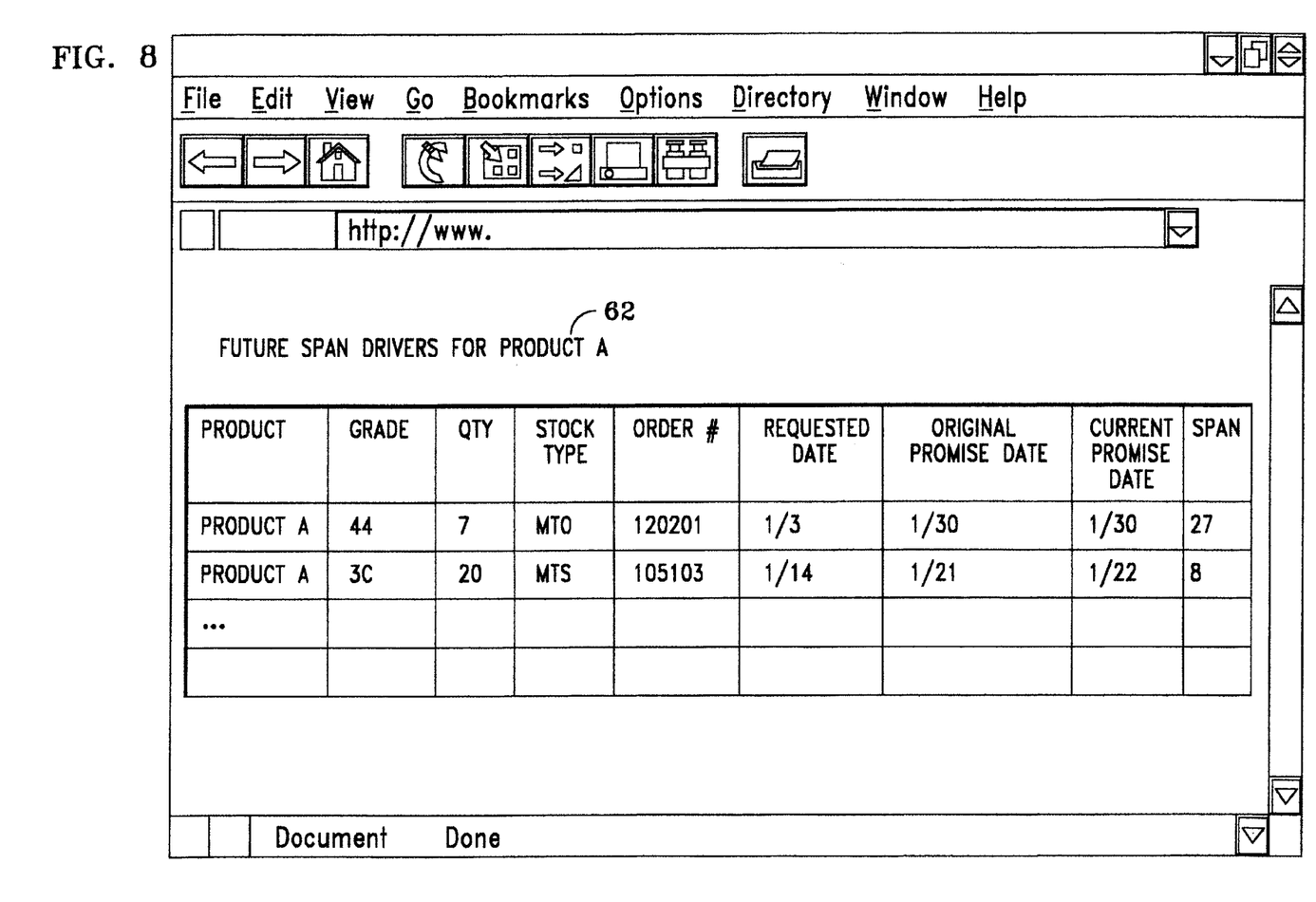
FIG. 8 depicts an exemplary report of future orders affecting span.

If the user selects report button 56, a report indicating future order span drivers is provided to the user system 18. The future order span driver report details future orders (i.e., orders having requested delivery dates equal to or later than the current date) for which the requested delivery date does not equal the promised delivery date. These unshipped orders have not yet become backorders because the requested delivery date is not prior to the current date. Nevertheless, these orders are likely to generate positive span values because the promised delivery date is later than the requested delivery date. An exemplary report is shown in FIG. 8 and indicates future orders for which the requested delivery date does not equal the promised delivery date. The report includes as designator 62 for the orders in the report that coincides with the scope selected by the user in drop down menu 60.

Information regarding the orders in the report includes a product identifier, a product grade, quantity of the order, stock type (make to stock, make to order, etc.) and an order number. It is understood that additional information may be included in the report such as the customer service employee who entered the order, the line that produced the order, etc. Any information that is contained in database 70, as described in further detail herein, may be incorporated into the report. The report includes the span value derived from the current promised delivery date minus the requested delivery date. Accordingly, the user can prioritize orders to ship orders having the greatest effect on the product provider's overall span.

Figure 9:
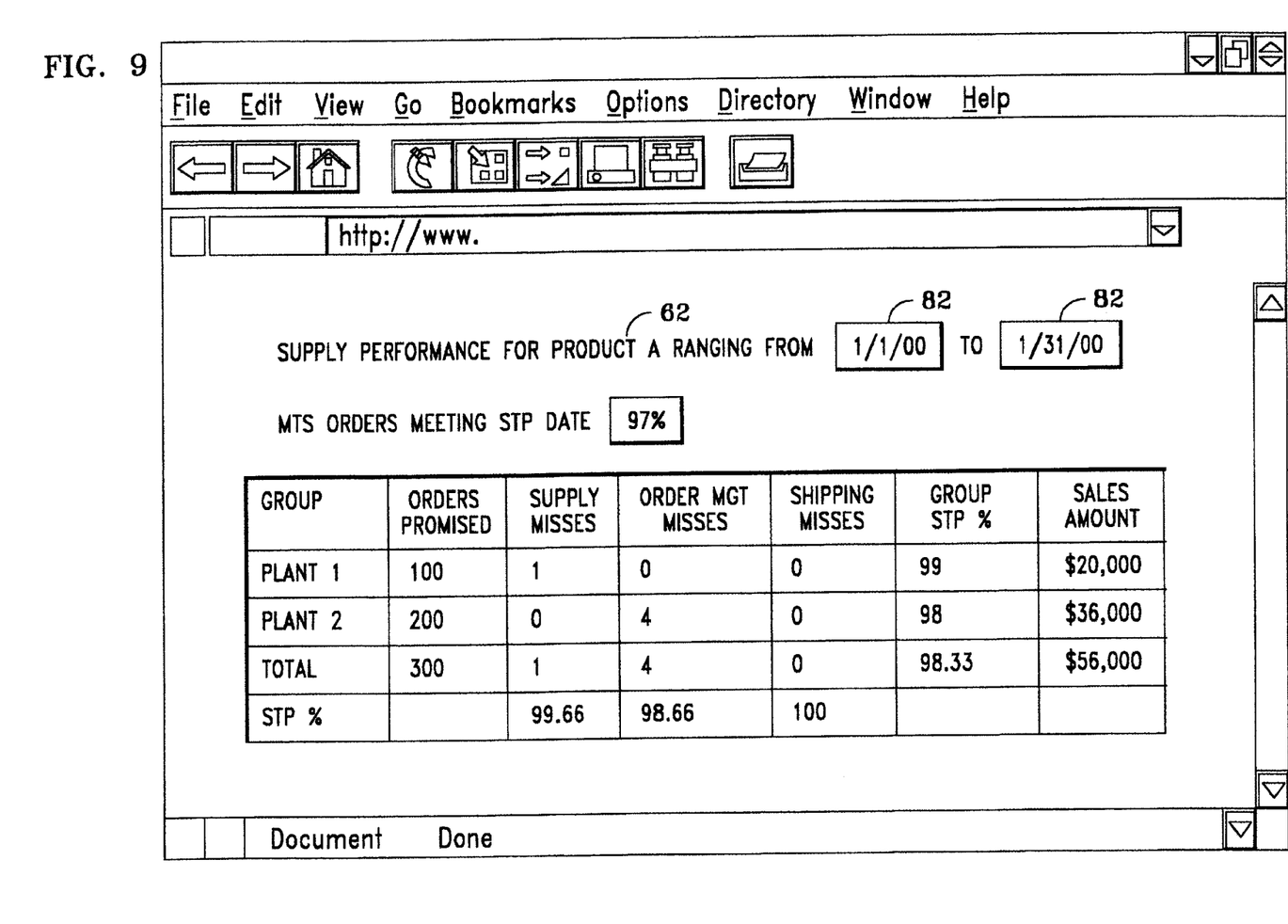
FIG. 9 depicts an exemplary report of supply performance.

If the user selects button 58, a report indicating product delivery performance for a period of time. An exemplary report is shown in FIG. 9. The report includes a designator 62 for the orders in the report that coincides with the scope selected by the user in drop down menu 60. The report can be specified for a period of time through time range fields 82. All shipped orders meeting the user-defined scope (e.g., product A) and having a promised delivery date falling in the time range are contained in the report. The report summarizes how well the product provider met the promised delivery date. The orders may be broken down by groups filling the orders as shown in FIG. 9.

The report includes the number of orders promised, the number of misses (i.e., failure to meet the promised delivery date) due to supply factors, order management factors and shipping factors. A supply miss is an order for which the product was not in inventory at a predetermined time (e.g., 24 hours) prior to the promised delivery date. An order management miss is an order for which the product was in inventory at a predetermined time (e.g., 24 hours) prior to the promised delivery date but was not selected or pulled from inventory at a predetermined time (e.g., 24 hours) prior to the promised delivery date by, for example, the warehouse/preparation for shipment process 22. A shipping miss is an order for which the product was in inventory at a predetermined time (e.g., 24 hours) prior to the promised delivery date, was selected or pulled from inventory at a predetermined time (e.g., 24 hours) prior to the promised delivery date but was not shipped to the customer by the promised delivery date.

The percentage of orders meeting the promised delivery date and the dollar amount for the orders is also included in the report. This information is provided for each group filling the orders for all orders. The percentage of orders delivered on the promised delivery date is also provided for each type of miss. Also included in the report of FIG. 9 is the percentage of orders for made to stock products (MTS) where the promised delivery date was met by the product supplier.

The exemplary reports shown in FIGS. 5–9 are generated by the host system 14 accessing database 70. Database 70 includes records for all orders placed with the product provider. The information in database 70 includes the order information presented in FIGS. 5–9 and additional information such as customer information, manufacturing information, shipping information, price and credit information, etc. The host system 14 queries the database 70 to generate the reports and provides the reports to the user system 18 via network 12. As described above, the applications server 39 in host system 14 executes one or more computer programs contained in a storage medium accessible by the applications server 39. The user system 18 may be operated by an employee of the product provider to determine how to improve product delivery.

An exemplary application of the invention is for use by a manufacturer of plastics to monitor product delivery and improve aspects of the supply chain to reduce span values. The reports may indicate that a particular product or a particular manufacturing location is creating excessive delivery errors. The user can then focus resources to improve product delivery and reduce span values.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for providing information on product delivery from a product provider to a product receiver in a system having a user system coupled to a host system through a network and a database coupled to the host system, the method comprising:

receiving at the host system a request from a user system for a product delivery report;

obtaining order data from said database in response to said request;

generating the product delivery report in response to said order data, said order data including a requested delivery date for at least one order, said product delivery report containing a span value for one or more orders, said span value being determined in response to said requested delivery date; and, providing said product delivery report to said user system.

2. The method of claim 1 wherein:

said product delivery report is a backorder span driver report containing orders having a requested delivery date prior to a current date, wherein said span value is equal to the current date minus the requested delivery date.

3. The method of claim 1 wherein:

said product delivery report is a future order span driver report containing orders having a requested delivery date not equal to a promised delivery date, wherein said span value is equal to the promised delivery date minus the requested delivery date.

4. The method of claim 1 wherein:

said product delivery report is a product delivery performance report containing orders shipped during a user-defined time period, the product delivery performance report including an indication of failures to meet the requested delivery date due to supply factors, order management factors and shipping factors.

5. The method of claim 4 wherein:

said indication of failures to meet the requested delivery date includes the number of failures to meet the requested delivery date due to supply factors, order management factors and shipping factors.

6. The method of claim 4 wherein:

said indication of failures to meet the requested delivery date includes a percentage of orders failing to meet the requested delivery date due to supply factors, order management factors and shipping factors.

7. The method of claim 1 further comprising:

receiving from the user system a scope for said product delivery report;

wherein said obtaining order data is limited in response to said scope.

8. The method of claim 7 wherein:

said scope identifies a product.

9. The method of claim 1 wherein:

said product is plastic.

10. A system for providing information on product delivery from a product provider to a product receiver, the system comprising:

a host system;

a database coupled to said host system, said database containing order data for a plurality of products;

a user system connected to said host system through a network;

said host system receiving a request from said user system for a product delivery report;

said host system obtaining order data from said database in response to said request;

said host system generating the product delivery report in response to said order data, said order data including a requested delivery date for at least one order, said product delivery report containing a span value for one or more orders, said span value being determined in response to said requested delivery date; and, said host system providing said product delivery report to said user system.

11. The system of claim 10 wherein:

said product delivery report is a backorder span driver report containing orders having a requested delivery date prior to a current date, wherein said span value is equal to the current date minus the requested delivery date.

12. The system of claim 10 wherein:

said product delivery report is a future order span driver report containing orders having a requested delivery date not equal to a promised delivery date, wherein said span value is equal to the promised delivery date minus the requested delivery date.

13. The system of claim 10 wherein:

said product delivery report is a product delivery performance report containing orders shipped during a user-defined time period, the product delivery performance report including an indication of failures to meet the requested delivery date due to supply factors, order management factors and shipping factors.

14. The system of claim 13 wherein:

said indication of failures to meet the requested delivery date includes the number of failures to meet the requested delivery date due to supply factors, order management factors and shipping factors.

15. The system of claim 13 wherein:

said indication of failures to meet the requested delivery date includes a percentage of orders failing to meet the requested delivery date due to supply factors, order management factors and shipping factors.

16. The system of claim 10 wherein:

said host system receives from the user system a scope for said product delivery report;

wherein said obtaining order data is limited in response to said scope.

17. The system of claim 16 wherein:

said scope identifies a product.

18. The system of claim 10 wherein:

said product is plastic.

19. A storage medium encoded with machine-readable computer program code for providing information on product delivery from a product provider to a product receiver in a system including a user system coupled to a host system through a network and a database coupled to the host system, the storage medium including instructions for causing the host system to implement a method comprising:

receiving a request from a user system for a product delivery report;

obtaining order data from said database in response to said request;

generating the product delivery report in response to said order data, said order data including a requested delivery date for at least one order, said product delivery report containing a span value for one or more orders, said span value being determined in response to said requested delivery date; and, providing said product delivery report to said user system.

20. The storage medium of claim 19 wherein:

said product delivery report is a backorder span driver report containing orders having a requested delivery date prior to a current date, wherein said span value is equal to the current date minus the requested delivery date.

21. The storage medium of claim 19 wherein:

said product delivery report is a future order span driver report containing orders having a requested delivery date not equal to a promised delivery date, wherein said span value is equal to the promised delivery date minus the requested delivery date.

22. The storage medium of claim 19 wherein:

said product delivery report is a product delivery performance report containing orders shipped during a user-defined time period, the product delivery performance report including an indication of failures to meet the requested delivery date due to supply factors, order management factors and shipping factors.

23. The storage medium of claim 22 wherein:

said indication of failures to meet the requested delivery date includes the number of failures to meet the requested delivery date due to supply factors, order management factors and shipping factors.

24. The storage medium of claim 22 wherein:

said indication of failures to meet the requested delivery date includes a percentage of orders failing to meet the requested delivery date due to supply factors, order management factors and shipping factors.

25. The storage medium of claim 19 further comprising instructions for causing the host system to implement:

receiving from the user system a scope for said product delivery report;

wherein said obtaining order data is limited in response to said scope.

26. The storage medium of claim 25 wherein:

said scope identifies a product.

\* \* \* \* \*